United States Patent
Jeffras

[11] 3,721,118
[45] March 20, 1973

[54] CURVATURE CONTROL

[75] Inventor: Nathaniel B. Jeffras, Woodland Hills, Calif.

[73] Assignee: Automation Industries, Inc., Century City, Calif.

[22] Filed: Feb. 22, 1971

[21] Appl. No.: 117,417

[52] U.S. Cl. ................................. 73/67.8, 73/71.5
[51] Int. Cl. ................................. G01n 29/04
[58] Field of Search............73/67.5, 67.6, 67.7, 67.8, 73/67.8 S, 67.9, 71.5 U; 318/573, 575, 596, 577, 578, 579, 663, 569, 570

[56] References Cited

UNITED STATES PATENTS

| | | | |
|---|---|---|---|
| 2,751,169 | 6/1956 | Kutzler | 318/663 X |
| 2,827,602 | 3/1958 | Horsfall, Jr. et al. | 318/569 |
| 3,136,933 | 6/1964 | Whitemore et al. | 318/573 |
| 3,575,043 | 4/1971 | Allen et al. | 73/67.8 S |

*Primary Examiner*—James J. Gill
*Attorney*—Dan R. Sadler

[57] ABSTRACT

Herein described in an electrical control system for guiding a search unit of a nondestructive material tester over sloped or curved surface shapes and particularly to an index system used on a scanning device. For the slope control, a linear control potentiometer is mechanically geared to one index axis and the linear feedback potentiometer is mechanically geared to the other index axis. An index command initiates an indexing causing the linear control potentiometer to advance. A tangent potentiometer sets the voltage across the linear control potentiometer in proportion to the slope of the angle. The advance of the linear control potentiometer unbalances the inputs to the operational amplifier which gates on the other axis control advancing the linear potentiometer until the inputs are balanced. For curvature control, a sine/cosine potentiometer is null balanced by the linear feedback control potentiometers by stepping motors to provide a closed loop curvature control program. Pulses are also applied to each search unit open loop coordinate axis through dividing circuits to provide reduction of the coordinate axis. Advance of the sine/cosine control during indexing, unbalances inputs to the operational amplifiers which gate on an oscillator. Outputs of each control gate is applied to the feedback motor and to an open loop search unit axis control. The feedback motor advances the feedback linear potentiometer until a null balance condition exists and the gate is turned off.

16 Claims, 13 Drawing Figures

Nathaniel B. Jeffras,
INVENTOR.
BY.

ATTORNEY.

Nathaniel B. Jeffras,
INVENTOR.

BY.

ATTORNEY.

Nathaniel B. Jeffras,
INVENTOR.

CURVATURE CONTROL

BACKGROUND

This invention relates to material testers and more particularly to novel and improved systems for directing a search unit of an ultrasonic nondestructive material tester, for example over curved or sloped surfaces and the like.

Presently, it is conventional to inspect workpieces for flaws or defects contained therein by ultrasonic nondestructive testing methods. These methods include an ultrasonic transducer, such as a piezoelectric crystal which when energized by an electrical stimulus radiates a beam of ultrasonic energy into a workpiece. If the familiar pulse/echo search unit is used, the ultrasonic energy is then reflected back from a defect within the workpiece to the crystal whereby the mechanical vibrations thereof are translated back into electrical signals. In this method, the time of arrival of the return signal indicates the presence and the exact location of defects within the workpiece. On the other hand, when the familiar "through" transmission system is used, a separate transducer is aligned opposite the workpiece and attenuations due to the defects in the workpiece or changes in the time of arrival of the signal is indicative of some characteristic of the workpiece.

It has been found in ultrasonic testing systems, that the pulse/echo system is generally best suited for large workpieces, whereby the search unit must scan the workpiece to make sure that the entire area of the workpiece is inspected for defects. Normally these scans are made in one direction and indexed before the return scan is made. On the other hand if conical, frustro-conical, hemispheric or other shaped workpieces are used they are affixed to a rotating worktable and an indexing search unit is used.

As is well known to those skilled in the art, ultrasonic energy is greatly attenuated in air, thus, it is oftentimes necessary to emerge the workpiece and the search unit into a couplant material, such as water, so that good ultrasonic coupling is possible. Thus, it is necessary on large workpieces for example, to have a large test tank available which is filled with water or other suitable couplants. The search unit is then scanned relative to the workpiece while both are emerged in the couplant fluid in the test tank.

In normal operation, it has been found that when inspecting flat workpieces, a search unit only need to be operated along the X and Y axis of the workpiece. But a difficulty exists when the workpiece is of a irregular shape. For example, the workpiece may have sloped or curved surfaces. In order to compensate for the irregular shapes, such as the slopes and curves hereinafter mentioned, a third axis (and/or fourth axis) of movement is necessary for the search unit. Not only must the search unit move in the X and Y axis, but also the search unit must move in the Z axis (and sometimes gimbal axis). As an example, a scan is only made in a single direction but indexing may be necessary in two other axes to advance the search unit parallel to a curved or sloped surface.

Heretofore, such devices capable of causing the three axes motion has included very complicated electrical tape programmed reading systems and digital and/or analog computers for deriving the voltages to change axis positions in the index axes and gimbal directions. As can be seen, such tape controlled devices and computers for performing such functions are quite expensive so that in most cases, programmed indexing/gimballing has been performed manually. While of course this latter operation is less expensive, it is undesirable to provide an operator for continuously indexing or moving the position of search unit after each scan of the search unit.

An example of the types of workpieces which are difficult to scan during ultrasonic testing is continuously sloped workpieces. On these workpieces, a simultaneous position change between the X and Z axis is necessary during the indexing so that the hypotenuse of the angle between the X and Z axis is changed, for example, the angle may be between 0° and 45°. Another type of workpiece which is difficult to inspect is a curved workpiece which as convex or concave surface such as the cockpit cover or the wing of an aircraft.

It is therefore extremely desirous of providing an electrical control system which can control the axis positions of a three dimensional object so as to perform the defect searching maneuvers on these workpieces which are difficult to scan.

SUMMARY

The above problems in scanning irregular shaped workpieces which were heretofore difficult to inspect by a search unit scanning system are overcome by the present invention. Control of the search unit for slope and curved workpieces is accomplished by the system hereinafter described as embodiments of the present invention. The basic scanning and/or indexing system used by the test system of this invention comprises for example, a high speed rectilinear (or rotational) scan and horizontal (and vertical) index at right angle to the scan axis. The system described herein and in accordance with one aspect of the present invention, simultaneously proportions the two above index axes to provide an index in a composite plane, that is, longitudinal (or traverse) and vertical index axis components.

One of the purposes of the slope control of the present invention is to provide a scanner index calibrated into degrees which are parallel to an inclined workpiece surface, such as provided by an inclined panel, inclining rotating cylinders, or rotating conical section.

The system described in one preferred embodiment is comprised of a linear control potentiometer, the applied voltage of which is attenuated by a tangent potentiometer. The linear control potentiometer is coupled to be responsive to one index axis either the X or the Y. A linear feedback potentiometer is mechanically geared to the other index axis (Z). A balance control is provided to set the system in a quiescent state at a null balanced condition.

The normal index command initiates Y indexing which causes the linear control potentiometer to advance a predetermined increment of travel. The tangent potentiometer sets the voltage across the linear control potentiometer in proportion to the slope of the angle set. Advancing of the linear control potentiometer unbalances the input to the operational amplifier which "gates on" the Z axis control. The Z axis movement advances the linear feedback potentiometer until the operational amplifier input is again balanced. The mechanical advance of the Z axis and the linear feedback potentiometer is consequentially reduced by the proportion established by the tangent potentiometer.

Further included in the present invention, there is provided a system for indexing a search unit which tracks on various diameters of circular shaped parts for example, rotated spheres, scanned cylindrical sections, etc. A constant search unit axis to workpiece radial line attitude is maintained throughout the entire inspection. The purpose of this latter embodiment is to permit various curvature radii (convex/concave) to be followed by operator set controls. The system in accordance with the present invention eliminates the aforesaid need for numerical control tape control and the expensive and elaborate digital and/or analog computer systems and allows various radii length to be set by a single control.

In the described embodiment, a sine/cosine index axis control potentiometers (or other trigonometric program element) are null balanced by linear feedback potentiometers driven by translator controlled stepping motors to provide a closed loop curvature control program. Pulses to the feedback translator are also applied to search unit open loop coordinate axis through conditioning counters (radius control) to provide the desired reduction of the coordinate axis.

The system master index control initiates simultaneous indexing of the search unit gimbal angle and ganged sine/cosine potentiometer. For example, for every one degree of gimbal angulation, there is a corresponding 1/90 full range index of the sine/cosine control with a maximum of 90°.

Advancing of the sine/cosine control unbalances one or both of the index axes operational amplifiers which gates on a slave control oscillator. Outputs of the control gates are applied to the feedback translator and open loop search unit axis control. The feedback translator advances the feedback linear potentiometer until a null balance condition exists and the gate is turned off.

Both closed loop curvature program axes complete a full angular displacement as established by the operator. Open loop output pulses are applied to the operators set conditioning counters (pulse dividers) and proportionally reduces the pulses to the axis motors.

DRAWINGS

These and other features and advantages will become more apparent to those skilled in the art when taken into consideration with the following detailed description wherein like reference numerals indicate like and corresponding parts throughout the several views and wherein.

DESCRIPTION

Turning now to a more detailed description of one embodiment of this invention there is shown in FIGS. 1A through 1D, typical three axes control mechanical gearing mechanism positions in nondestructive testing apparatus which is applicable to both the curvature control circuit and the slope control circuit which will hereinafter be described.

Figures 1A, 1B, 1C, 1D, 2A, 2B:
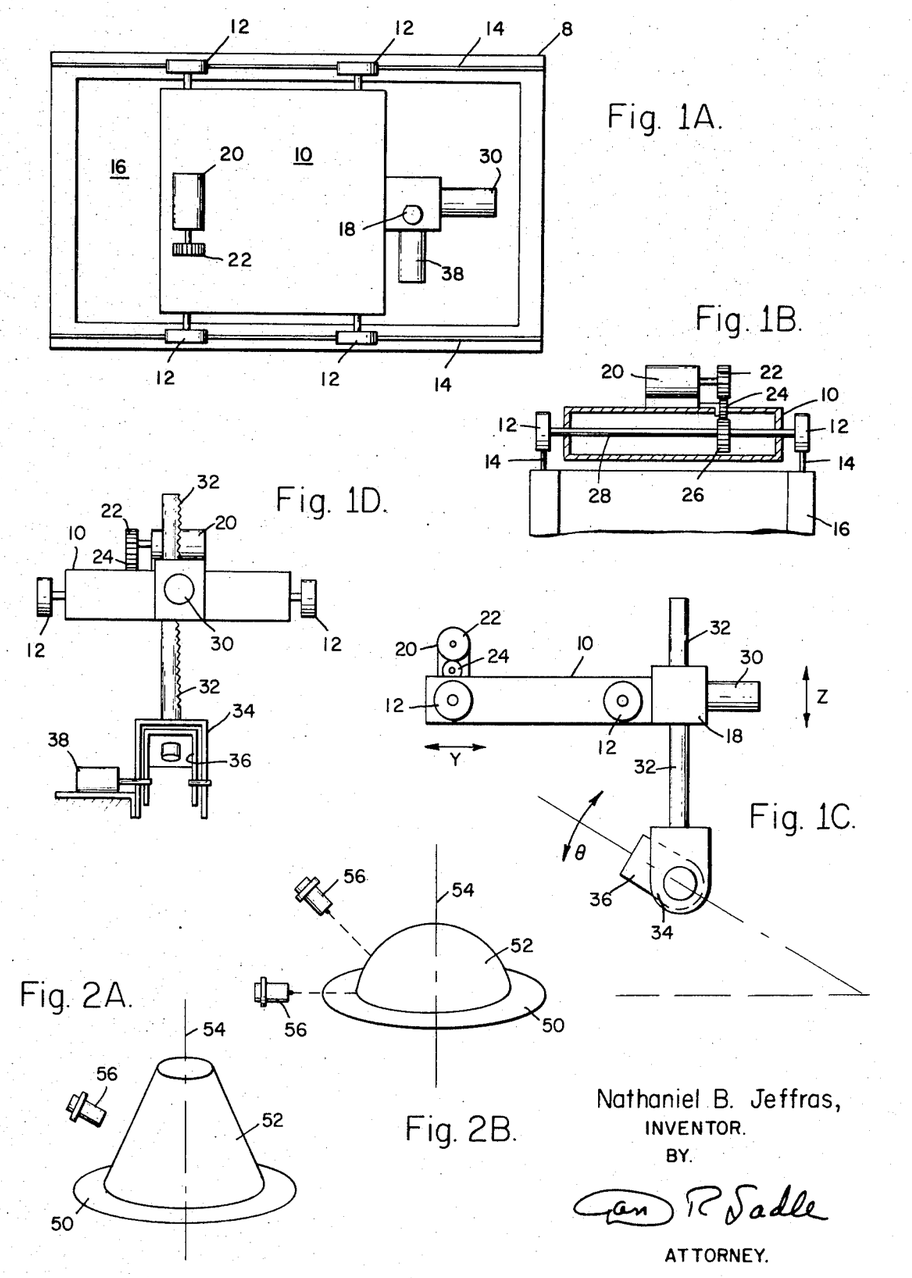
FIGS. 1A through 1D specifically illustrate a bridge and carriage embodiments which are used to perform nondestructive searching of workpieces.
FIG. 2A illustrates a typical workpiece which has an inclined surface which can be inspected by operation of the control system in accordance with one embodiment of this invention.
FIG. 2B illustrates a curved surface which can effectively be scanned by the search unit in accordance with another embodiment of the present invention.

FIG. 1A is a top view of a test tank 8 having a bridge 10 which includes four rollers 12 positionable on rails 14 on the sides of the test tank 8 which may be filled with the liquid couplant 16. The bridge 10 spans across the tank 8 and couplant 16 and has a carriage 18 mounted thereon to carry a search unit for performing the nondestructive testing. A motor 20, which may be a stepper motor, is mounted on top of the bridge 10 and includes a pulley 22 thereon which is coupled by appropriate means, such as gearing or V belt or the like 24, onto a pulley or gear 26 which is affixed to an axle 28 which drives the rear wheels 12 of the carriage 10. As the motor 20 receives electrical energy from a source hereinafter to be described, the bridge 10 is moved an increment of travel along the longitudinal axis of the test tank 8. The increments are in predetermined distances which are governed by the pulse width of the source. A motor 30, which may also effectively be a stepper motor, is mounted to the carriage 18 which moves the search unit in its vertical motion. Effectively the carriage 18 may include therein a rack and pinion arrangement which moves the shaft 32 vertically in a vertical motion. The shaft 32 extends into the tank 8 and includes a U-shaped bracket 34 securely mounted thereon. A second U-shaped bracket 36 which is adapted to hold the search unit, not shown, is pivotally mounted to the U-shape bracket 34 and is moveable by a gimbal drive motor 38 which may also be a stepper motor. The motor 38 is used to position the angle of the transducer search unit in relation normal to the test surface of the workpiece being tested specifically, those workpieces shown in FIGS. 2A, 2B and 3, hereinafter described. Therefore, when electrical pulses are applied to the motor 30 and the motor 20 simultaneously, the search unit moves on a incline plane. The slope of the search unit is dictated by the motor 38 to set it normal to the plane of of the workpiece being scanned for defects.

The workpiece itself is mounted within the test tank 8 on a turn-table and is rotated thereon with relation to the position of the search unit. After each complete revolution of the workpiece, an index switch is tripped and the search unit is indexed an increment dictated by the circuitry hereinafter to be described and the scan is made of the workpiece a second time across a different scan line.

With reference now to FIG. 2A, there is shown a support in the form of a turn-table 50 which has a workpiece 52 positioned thereon wherein the turn-table 50 is rotatable about the Z axis 54. A search unit 56, which includes a piezoelectric crystal transducer for performing the search function, is angular disposed normal to the surface of the workpiece 52. It should be understood that the search unit 56 is coupled to a mechanical gearing apparatus which moves it along the Y and Z axis in a manner heretofore described in connection with FIGS. 1A through 1D. The search unit 56, workpiece 52 and turn-table 50 are placed within the couplant in the test tank 16.

With reference now to FIG. 2B, it can be seen that the search unit 56 is positioned near the workpiece 52 which in this particular case happens to be a curved convex surface and mounted on a rotating work table 50. In this case, not only must index movement in the Y and Z axis be provided, but also the search unit 56 must be provided on suitable gimbals so that it is indexed a certain angular increment with each movement along the Y-Z axis. The same is true with the system shown in FIG. 3 except of course, with a simple curved surface the scan is made horizontal to the curved surface but indexing/gimbaling of the search unit 56 is also necessary.

Figures 3, 4, 5, 6, 8:
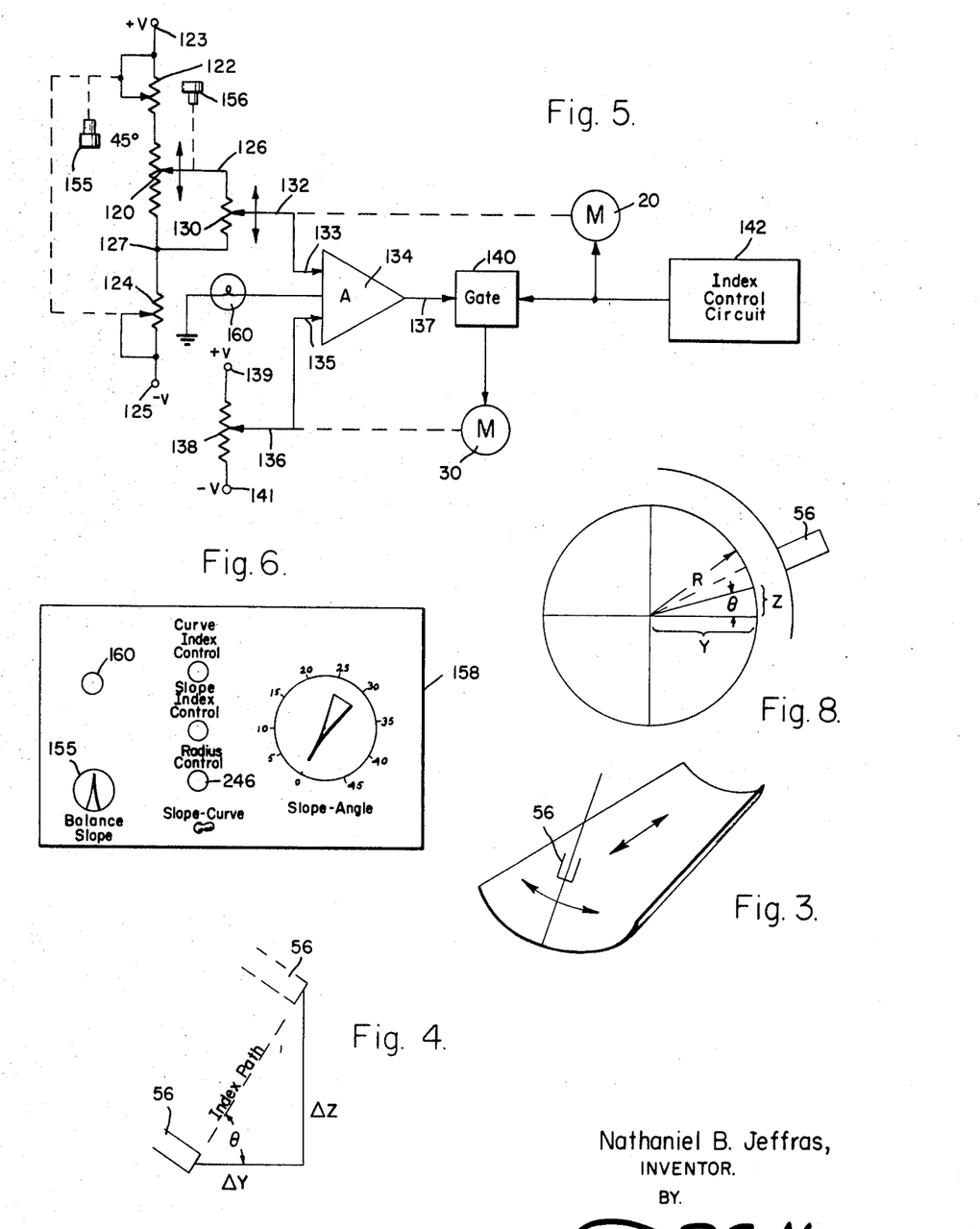
FIG. 3 illustrates a convex workpiece which can effectively be scanned with the control system in accordance with one of the embodiments of this invention.
FIG. 4 is a graphic illustration indicating the angular index path which uses changing coordinates of the embodiment shown in FIG. 5.
FIG. 5 is a schematic and block diagram of the control system of one embodiment of this invention useful in slope movement of an indexing scan system.
FIG. 6 is a front view of a control panel used in conjunction with the system of this invention.
FIG. 8 is a graphic illustration indicating index path which uses changing coordinates of the embodiment shown in FIG. 7.

The graph in FIG. 4 shows relative movement necessary along the Z and Y axis to provide the change in the search unit 56 position along the incline slope set forth therein as the index path. The system set forth hereinafter for slope control operates in accordance with the equation: $\theta = \tan^{-1}(Z/Y)$.

SLOPE CONTROL CIRCUIT

With reference now to FIG. 5, there is shown in this preferred embodiment which is specifically a slope control, a potentiometer 120 which has one end thereof coupled through a rheostat 122 to a terminal 123 having a (+V) voltage potential. The other end of the potentiometer 120 is coupled through a second balance rheostat, 124, to a terminal 125 which has a (−V) voltage potential applied thereto. The wiper arm 126 of potentiometer 120 is coupled to one end of the linear potentiometer 130, and the other end of the linear potentiometer 130 is coupled to the connection 127 between the rheostat 124 and the potentiometer 120. The output of the wiper arm 132 of potentiometer 130 is coupled as one input 133 to an operational amplifier 134. Operational amplifier 134 has a second input 135 which is coupled to the wiper arm 136 of a linear potentiometer 138. One end of the potentiometer 138 is coupled to a terminal 139 having a (+V) voltage potential thereon while the end of potentiometer 138 is coupled to a terminal 141 having a (−V) voltage potential applied thereon.

The output lead 137 of the operational amplifier 134 is coupled to a gate 140 and provides the gating signal to gate that particular gate in an on condition when there is an output signal from the operational amplifier 134. When a voltage is present from the operational amplifier 134, gate 140 is enabled allowing pulses from control circuit 142 to be applied to the motor 30 (FIG. 1). The control circuit 142 is also coupled directly to the motor 20 which drives the wiper arm 132 of potentiometer 130. The motor 30 has a shaft which is mechanically coupled to the wiper arm 136 of the linear potentiometer 138.

As will be hereinafter described in connection with FIG. 9, index control circuit 142 produces a fixed number of pulses at each index time, driving motor 30 in turn drives wiper arm 132, changing the voltage level on input 133 into amplifier 134. This unbalance occurs immediately after a small number of pulses are applied to the motor 20. Upon imbalance of amplifier 134, gate 140 is enabled and motor 30 begins to drive wiper arm 136 changing the voltage to input 135 of amplifier 134. Because the voltage level to potentiometer 130 is higher than the voltage from wiper arm 132, the voltage now is quickly attained in the operational amplifier 134 by the time the balance of the pulses are received from index control circuit 142. The reason that the voltage level is higher on potentiometer 138 than on potentiometer 130 is because it is adjusted lower by the potentiometer 120 when knob 156 is turned. In this manner the time to null of amplifier 134 can be adjusted. A full discussion of the control circuit 142 will be more fully set forth and described later on.

During index time, index control circuit applies pulses to motor 20 and to motor 30 when gate 140 is enabled.

The circuit set forth in FIG. 5 is one embodiment of a slope control which provides indexing control used in the test system herein and comprises a high speed rectilinear or rotational scan and horizontal and vertical index at right angles to the scan axis. When operating the system of this device in conjunction with an incline plane for example, the workpiece shown in FIG. 2A, it can be seen that the index pattern is derived from the equation: Slope = $\Delta Z/\Delta Y$ $\theta = \tan^{-1}(\Delta Z/\Delta Y)$ as set forth in FIG. 4. Thus it is necessary to provide a change in Z incrementally with a change in Y on each index of the search unit 56 along the incline plane of the workpiece 52. This is accomplished with the aforesaid circuitry by setting the desired voltage ratio on the wiper arm 126. This can be performed by manipulation of a knob 156 on the test panel 158 shown in FIG. 6, which in turn moves the wiper arm 126 across the resistive element on potentiometer 120. Because the potentiometer 120 is a tangent potentiometer, that is the angle $\theta = \tan^{-1}(Z/Y)$ wherein Z is the abscissa and Y is the ordinate in the graph in FIG. 4, a voltage which is a function of the abscissa and the ordinate and magnitude of the abscissa is applied to the input 133 on the operational amplifier 134.

The operational amplifier 134 may for example, be a differential amplifier which provides an output on lead line 137 as long as the two inputs thereto 133 and 135 are out of balance or of different potential levels. When they are balanced and the levels are exactly the same, the output thereto is zero and an indication light 160 as shown in FIG. 5 and FIG. 6 is lit. No output appears on lead line 137 when inputs 133 and 135 are out of balance in the opposite direction.

CURVE CONTROL CIRCUIT

Referring now to FIGS. 2B and 3, there is shown a pair of workpieces which have curved shapes which cannot be ideally scanned with an automatic system, as set forth in the prior art. Yet these types of workpieces can be effectively scanned with the embodiment shown in FIG. 7 and described hereinafter. The curvature control circuit of FIG. 7 can position the search unit 56 on both the horizontal and the vertical axes during indexing and also gimbal the search unit 56 to maintain it constantly normal to the surface of the workpiece.

With reference to FIG. 3 there is shown a cylindrical (concave) scanning system which is operable in accordance with the system set forth and described in connection with FIG. 7 which provides positioning of the search unit 56 during indexing as in the embodiment set forth above, except that the search unit scans in the X axis and the cylindrical section remains in a fixed position. The curvature indexing of the search unit is in the Y-Z plane and the gimbaling is also in the Y-Z plane.

Figure 7:
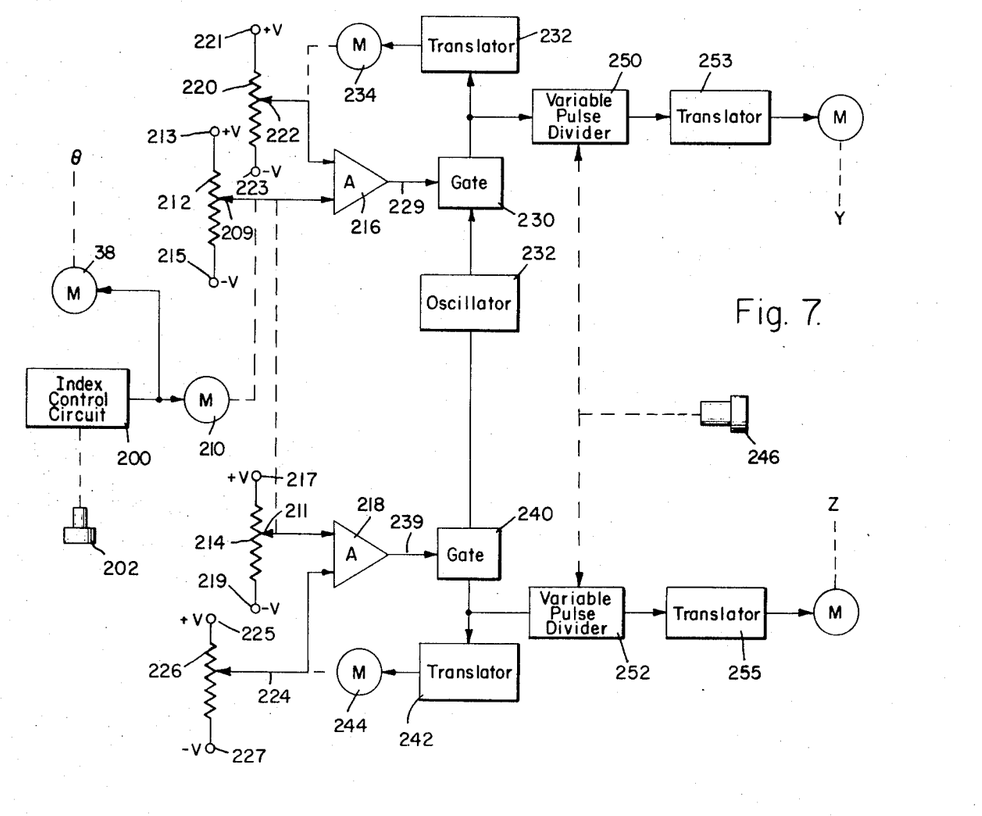
FIG. 7 is a schematic and block diagram of the control system of one embodiment of this invention useful for curvature movement of the indexing scan system.

With reference now to FIG. 7 there is shown an index control means 200 hereinafter described with reference to FIG. 9, which is used to provide pulses simultaneously to motor 38 (FIG. 1) and a motor 210 at the index time of the scan. The motor 38 is used to gimbal the search unit 56 by applying an incrementing pulse thereto. Gimballing of motor 38 may also be controlled by a control potentiometer and linear feedback potentiometer similar as described herein, for following curves other than circular in geometry.

Potentiometers 212 and 214 are ganged sine/cosine potentiometers of the type well known to those skilled in the art, whereby the output signal from wiper arms 209 of sine potentiometer 212 is equal to the sine of the angle of movement from motor 210 (or $Z = R \sin \theta$ with reference to FIG. 8) and the output of the wiper arm 211 of the potentiometer 214 is the cosine of the angle of the movement of the motor 210 (or $Y = R \cos \theta$ with reference to FIG. 8). Sine potentiometer 212 has one terminal 213 coupled to a +V voltage potential and the other terminal 215 coupled to a −V voltage potential. Likewise cosine potentiometer 214 has one terminal 217 coupled to a +V voltage potential and the other terminal 219 coupled to a −V voltage potential. The wiper arm output 209 of sine potentiometer 212 is coupled to one input of an operational amplifier 216 and the wiper arm output 211 of cosine potentiometer 214 is coupled as an input into another operational amplifier 218. Operational amplifiers 216 and 218 are similar in operation and structure as the operational amplifier 134 set forth in connection with FIG. 5.

A linear potentiometer 220 has one terminal 221 coupled to a +V voltage and the other terminal 223 coupled to a −V voltage. The wiper arm 222 thereof is coupled directly as the other input of operational amplifier 216. Operational amplifier 218 has the other input thereof coupled to the wiper arm 224 of a linear feedback potentiometer 226 which has a terminal 225 coupled to a +V voltage potential and the other terminal 227 coupled to a −V voltage potential.

The output line 229 of operational amplifier 216 is coupled as a gating input to a gate 230. When the signal on output line 229 of operational amplifier 216 is high, the gate 230 is on and when it is low, gate 230 is off. The signal on output line 229 is high when the signal from feedback potentiometer 220 and the signal from sine potentiometer 212 are unequal or out of balance. The signal on output line 229 is low when the signals to the operational amplifier 216 are equal and the difference therebetween is null.

A master oscillator 232 is coupled through the gate 230 to a feedback pulse translator 232 which is coupled to a motor 234. As used throughout this specification, a pulse translator may be a circuit which transforms pulses into even amplitude and even width pulses for effective use by stepper motors. An example of such a pulse translator may be the type manufactured and sold under the tradename SLO-SYN by Superior Electric Company, Bristol, Connecticut. When the operational amplifier 216 gates the gate 230 on, pulses from the master oscillator 232 which are applied to the feedback translator 232 increments the motor 234. The motor 234 is mechanically coupled to the wiper arm 222 of linear feedback potentiometer 220 when motor 234 starts incrementing, wiper arm 222 increments on the potentiometer 220. When the output on wiper arm 222 from the linear potentiometer 220 and the output on wiper arm 209 from the sine potentiometer 212 are balanced, the output from the operational amplifier 216 is effectively nulled and the output therefrom drops to zero turning off gate 230 and stopping pulses from being applied to motor 234.

The output line 239 of operational amplifier 218 is coupled as a gating input to a gate 240 which is coupled between the master oscillator 232 and a further feedback pulse translator 242. The pulse translator 242 is coupled to a motor 244 which is mechanically coupled to wiper arm 224 of the linear feedback potentiometer 226. When the output signals on the wiper arm 211 from cosine potentiometer 214 and output signal on the wiper arm 224 of feedback linear potentiometer 226 are at a different level, an output signal will appear on the output line 239 of the operational amplifier 218 and the gate 240 will be gated on allowing pulses from the master oscillator 232 to be applied through the feedback translator 242 to motor 244. The motor 244 then drives the wiper arm 224 of feedback potentiometer 226 until the operational amplifier 218 is nulled. The gate 240 is then turned off and motor 244 is stopped.

The output pulses from gates 230 and 240 are applied to the motors 20 and 30 respectively to move them on the Y and Z axis as set forth in connection with FIG. 1. The outputs of gate 230 is coupled through a pulse divider circuit 250 and pulse translator 253 to motor 20. The output of gate 240 is coupled through a pulse divider and pulse translator 255 to motor 30. An open loop control system is provided to adjust the coordinate axis reduction amount which sets the radii length, as shown in FIG. 8, from zero to 15 inches for example, on hemispheric workpieces. This is provided by use of the pulse dividers 250 and 252, whereby each pulse divider divides the input pulses therefrom and applies them to the motors 20 and 30 respectively. A radius control knob 246 is coupled to the pulse dividers 250 and 252 and by manipulation of the control knob 246 (FIG. 6) the pulse dividers are of the type which are changed effectively to reduce the scale in each axis, if desired.

The system described in connection with FIG. 7 provides for search unit index tracking of various diameters of circular parts (rotating spheres, scan cylindrical section). A constant search unit axis piece center radial line attitude is maintained throughout the entire inspection. The purpose of the system is to permit various curvature radii (convex/concave) to be followed by the operator set controls. The sine/cosine index axes control potentiometers 212 and 214 are null balanced by the linear feedback potentiometers 220 and 226 which are driven by the translator controlled stepping motors 234 and 244. Pulses to the feedback translators 232 and 242 are also applied to search unit open loop coordinate axis through pulse dividers 250 and 252 (by the radius control circuit 248) to provide the desired reduction of coordinate axis.

The system master index control 200 initiates simultaneous index of the search unit gimbal axis provided by motor 38 and to the ganged sine/cosine potentiometers 212 and 214. Advance of the sine/cosine control through the wiper arms 209 and 211 of the potentiometers 212 and 214 unbalances one or both of the index axis operational amplifiers 216 and/or 218 which gates on the master oscillator 232 through gates 230 and 240. Output signals from the control gate 230 and/or 240 are applied to the feedback translator 232 or 242 and to the open loop search unit axis controls through the pulse dividers 250 and 252. The feedback translators 232 and/or 242 advances the feedback linear potentiometer 220 and/or 226 until a null balance condition exists and the gate 230 and/or 240 is turned off.

Both closed loop curvatures programmed axes complete a full angular displacement as established by the operator, through the index control 200. Open loop output pulses are applied to the operator set pulse dividers 250 and 252 and proportionally reduces the pulses from axis translators 253 or 255. The index increment magnitude is set by the knob 202 as hereinafter to be described and the radius control circuit which provides the frequency reduction in the pulse dividers 250 and 252 provided by manipulation of the knob 246.

INDEX CONTROL CIRCUITS

Figure 9:
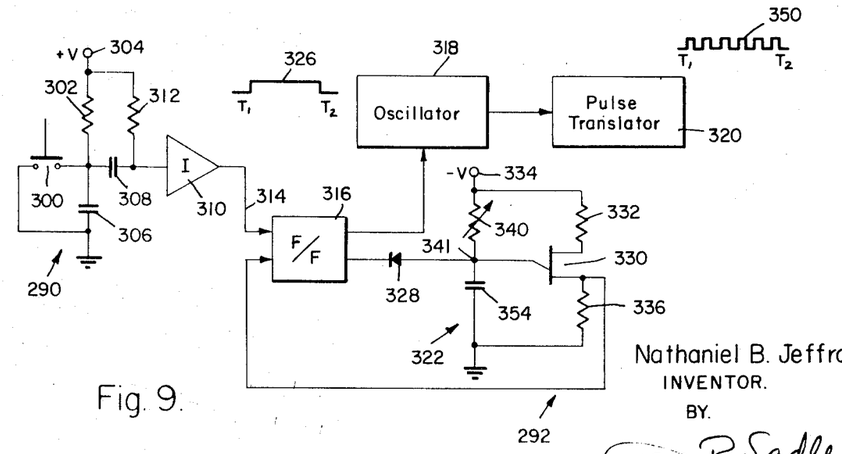
FIG. 9 is a schematic and block diagram of the index control system used in accordance with the described embodiments set forth in FIGS. 5 and 7.

The index control circuit referred to specifically by the numerals 142 in FIG. 5 and 200 in FIG. 7 may be the types specifically shown with reference to FIG. 9. The circuit includes a switching circuit 290, a timer circuit 322, an oscillator 318 and a pulse translator 320 of which is used to supply pulses to motor 38 in FIG. 7. Specifically a switch 300 is shown coupled between a ground reference and through a resistor 302 to a terminal 304 which has a +V voltage potential thereon. The switch is closed on each revolution of the turntable set forth in FIGS. 1 and 2, or after a complete scan time of the search unit 56 on an associated workpiece. The resistor 302 is also coupled to one end of a capacitor 306, the other end of which is the ground reference. The resistor 302 is also coupled to one end of a capacitor 308 and the other end of which is coupled to an inverter 310. A resistor 312 is coupled between the terminal 304 and between capacitor 308 and inverter 310.

When the switch 300 is open, a electrical charge is stored on the capacitor 308. When the switch 300 is closed, the capacitor 308 is discharged to ground applying a negative voltage to the inverter 310 which in turn places a positive voltage onto the set input line 314 of a flip-flop 316. Flip-flop 316 is then coupled into an oscillator 318 which applies pulses to the pulse translator 320. Flip-flop 316 stays on for the amount of time dictated by the timer circuit 322, which is the distance between T1 and T2 on the graph 326 depicting the pulse therefrom.

The timer circuit 322 comprises a diode 328 which is coupled to the base of a uni-junction transistor 330. The uni-junction transistor 330 has a source electrode coupled through a resistor 332 to a terminal 334 which has the +V voltage applied thereto. The gate electrode of uni-junction 330 is coupled through a capacitor 354 to the ground reference and the drain electrode is coupled through a resistor 336 to the ground reference and also to the reset input of flip-flop 316. The gate electrode is also coupled to a variable resistor 340 to the terminal 334.

During the time when flip-flop 316 is enabled, an output pulse 326 is applied to the oscillator 318. The capacitor 354 charges at a rate dictated by the RC time constant of capacitor 354 and the resistor 340. When capacitor 354 charges to the peak point, transistor 330 is enabled and starts conducting causing a positive reset pulse to be applied to the flip-flop 316 and removes the signal to the oscillator 318 causing it to turn off. When oscillator 318 is enabled by closing switch 300, the signals therefrom are applied through the pulse translator 320 where they are converted to pulses 350 for the time between T1 and T2. By changing the variable resistor 340, the time between T1 and T2 may be changed.

Having thus described only preferred embodiments of this invention, what is claimed is:

1. Apparatus of the class described for positioning an element along a path said apparatus including in combination:
   a voltage source;
   a tangent potentiometer being coupled across said voltage source, said tangent potentiometer including a resistive element and a movable wiper arm which provides a changeable voltage depending upon the position of the wiper arm on the resistive element;
   a first linear potentiometer being coupled to the wiper arm of said tangent potentiometer and having a voltage potential thereacross as set by the wiper arm of said tangent potentiometer, said first potentiometer including a resistive element and a wiper arm which provides a changeable voltage on said first linear potentiometer dependent upon the position of the wiper arm on the resistive element thereof;
   a second linear potentiometer including a resistive element being coupled across said voltage source, and a moveable wiper arm;
   a difference amplifier having a first input means coupled to the wiper arm of said first linear potentiometer and a second input means coupled to the wiper arm of said second linear potentiometer, for providing an output signal when the voltage applied to the first and second inputs are of different levels;
   a source of index signals for providing electrical signals at predetermined index times;

first feedback means coupled between said source of index signals and the wiper arm of said first linear potentiometer and responsive to the electrical signals from said source for advancing the position of the wiper arm of said first linear potentiometer and moving the indexed element in a first direction during the predetermined index times;

second feedback means coupled to the wiper arm of said second linear potentiometer for advancing the position of the wiper arm of said second linear potentiometer and moving the indexed element in a second direction orthogonal to said first direction, when electrical signals from said source are applied thereto; and gating means coupled between said source and said second feedback means and being responsive to the output signal from said difference amplifier for gating signals from said source to said second feedback means.

2. The combination as defined in claim 1 wherein said source of indexing signals including:
- a switching means being enabled at predetermined index times;
- a timer circuit being coupled to said switching means and being enabled thereby;
- a pulse oscillator being coupled to said timer circuit and being a enabled thereby during the occurrence of said timing signals; and
- a pulse translator being coupled to said oscillator for providing uniform pulses to said third and fourth feedback means.

3. The combination as defined in claim 1 wherein said feedback means including stepper motors.

4. Indexing apparatus for indexing a search unit including:
- index control means for providing index signals during predetermined index times of said search unit;
- sine/cosine means including a sine output means for providing a changeable sine voltage and a cosine means for providing a changeable cosine voltage;
- indexing means, being coupled to said index means and said sine/cosine means and being responsive to said index means, for proportionally changing the sine and cosine voltages;
- a first linearly variable means having a changeable output means for varying the output voltage thereof;
- a first balance means, including a first input means being coupled to the sine output means of said sine/cosine means and a second input means being coupled to the changeable output means of said first linear means, for providing an output signal when the input signals are at different characteristics;
- a second linearly variable means having a changeable output means for varying the output thereof;
- a second balance means, including a first input means being coupled to the cosine output means of said sine/cosine means and a second input means being coupled to the changeable output means of said second linear means, for providing an output signal when the input signals are at different characteristics;
- first feedback means, being coupled to the changeable output means of said first linear means, for changing the voltage thereon;
- second feedback means, being coupled to the changeable output means of said second linear means, for changing the voltage thereon;
- a source of electrical pulses;
- a first gate means, being coupled between said source and said first feedback means and being responsive to the output of said first balance means, for gating electrical pulses to said first feedback means during the predetermined index time;
- a second gate means, being coupled between said source and said second feedback means and being responsive to the output of said first balance means, for gating electrical pulses to said first feedback means during the predetermined index time; and
- means responsive to the outputs of said first and second gate means for moving said search unit.

5. The indexing apparatus as defined in claim 4 wherein said first and second feedback means including electrical stepper motors.

6. The indexing apparatus as defined in claim 4 wherein said first and second balance means being difference amplifiers.

7. The indexing apparatus as defined in claim 4 wherein said first and second linearly variable means being linear potentiometers.

8. The indexing apparatus as defined in claim 4 wherein said sine/cosine means being a sine/cosine potentiometer.

9. The indexing apparatus as defined in claim 4 wherein said indexing means being a stepping motor.

10. The indexing apparatus as defined in claim 4 wherein said index control means including:
- a switching means being enabled at predetermined index times;
- a timer circuit being coupled to said switching means and being enabled thereby;
- a pulse oscillator being coupled to said timer circuit and being enabled thereby during the occurrence of said timing signals; and
- a pulse translator being coupled to said oscillator for providing uniform pulses to said indexing means.

11. The indexing apparatus as defined in claim 10 wherein said first and second feedback means being electrical stepping motors.

12. Indexing apparatus for indexing a search unit of a nondestructive tester on curved workpieces said apparatus including in combination:
- a voltage source;
- an index control means for providing index signals during predetermined index times;
- a sine/cosine potentiometer including a sine resistive element being coupled across said voltage source and a moveable wiper arm thereon which provides a changeable sine voltage and a cosine resistive element being coupled across said voltage source and a moveable wiper arm thereon which provides a changeable cosine voltage;
- index motor means being coupled to the wiper arms of said sine/cosine potentiometer and said index control means and being responsive to said index control means for proportionally changing the sine and cosine voltages on the wiper arms of said sine/cosine potentiometer;

a first linear potentiometer including a resistive element being coupled across said voltage source and including a moveable wiper arm for providing a changeable voltage thereon;

a first difference amplifier including a first input being coupled to the wiper arm of the sine resistive element of said sine/cosine potentiometer and a second input being coupled to the wiper arm of said first linear potentiometer, for providing an output signal when the input voltages thereto are at a different voltage level;

a second linear potentiometer including a resistive element being coupled across said voltage source and including a moveable wiper arm for providing a changeable voltage thereon;

a second difference amplifier including a first input being coupled to the wiper arm of the cosine resistive element of said sine/cosine potentiometer and a second input being coupled to the wiper arm of said second linear potentiometer, for providing an output signal when the input voltages thereto are at different voltage levels;

first feedback means, being coupled to the wiper arm of the first linear potentiometer, for advancing the position of the wiper arm in response to electrical pulses thereto;

second feedback means, being coupled to the wiper arm of the second linear potentiometer, for advancing the position of the wiper arm in response to electrical pulses thereto;

an oscillator for providing electrical pulses;

a first gate means, being coupled between said oscillator and said first feedback means and being responsive to signals from said first difference amplifier, for gating electrical pulses from said oscillator to said first feedback means during the time said difference amplifier has an output signal therefrom;

a second gate means, being coupled between said oscillator and said second feedback means and being responsive to signals from said second difference amplifier, for gating electrical pulses from said oscillator to said second feedback means during the time said second difference amplifier has an output signal therefrom;

output means responsive to the outputs of said first and second gate means for moving the search unit in response to pulses thereto.

13. The combination defined in claim 12 and further including pulse divider means being coupled between said gate means and said output means.

14. The combination as defined in claim 13 wherein the frequency of pulses from said pulse dividers being changeable.

15. The combination as defined in claim 12 and wherein said feedback means including electrical stepping motors.

16. The combination as defined in claim 12 wherein said index control means including:

a switching means being enabled at predetermined index times;

a timer circuit being coupled to said switching means and being enabled thereby; and a pulse oscillator being coupled being enabled thereby during the occurrence of said timing signals and being coupled to said indexing means for applying pulses thereto during index times.

* * * * *